US008019821B2

(12) United States Patent
Hamilton et al.

(10) Patent No.: US 8,019,821 B2
(45) Date of Patent: Sep. 13, 2011

(54) METHOD FOR CREATING ADAPTIVE DISTRIBUTIONS

(75) Inventors: Rick Allen Hamilton, Charlottesville, VA (US); Jenny S. Li, Danbury, CT (US); Brian Marshall O'Connell, Cary, NC (US); Susan Marie Williams, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 11/924,648

(22) Filed: Oct. 26, 2007

(65) Prior Publication Data

US 2009/0113446 A1    Apr. 30, 2009

(51) Int. Cl.
*G06F 15/16* (2006.01)
(52) U.S. Cl. ........................................... 709/206
(58) Field of Classification Search .............. 709/207, 709/206
See application file for complete search history.

(56) References Cited

U.S. PATENT DOCUMENTS

| | | | |
|---|---|---|---|
| 5,283,856 A | 2/1994 | Gross et al. | |
| 5,377,354 A | 12/1994 | Scannell et al. | |
| 5,664,207 A | 9/1997 | Crumpler et al. | |
| 5,819,274 A | 10/1998 | Jackson, Jr. | |
| 5,828,836 A | 10/1998 | Westwick et al. | |
| 5,864,684 A | 1/1999 | Nielsen | |
| 5,917,489 A | 6/1999 | Thurlow et al. | |
| 6,047,310 A | 4/2000 | Kamakura | |
| 6,057,841 A | 5/2000 | Thurlow et al. | |
| 6,081,707 A | 6/2000 | Christensen et al. | |
| 6,148,064 A | 11/2000 | Christensen et al. | |
| 6,434,601 B1 | 8/2002 | Rollins | |
| 6,671,718 B1 | 12/2003 | Meister et al. | |
| 6,895,427 B2 | 5/2005 | Quine et al. | |
| 6,970,908 B1 | 11/2005 | Larky et al. | |
| 7,039,639 B2 | 5/2006 | Brezin et al. | |
| 7,042,588 B2 * | 5/2006 | Ueda et al. | 709/206 |
| 7,051,076 B2 * | 5/2006 | Tsuchiya | 709/206 |
| 7,155,419 B2 | 12/2006 | Blackman et al. | |
| 7,181,496 B1 | 2/2007 | Edwards et al. | |
| 7,249,160 B2 | 7/2007 | Nozaki et al. | |
| 7,249,175 B1 | 7/2007 | Donaldson | |
| 7,269,568 B2 | 9/2007 | Stiles et al. | |
| 7,343,303 B2 | 3/2008 | Meyer et al. | |
| 7,380,126 B2 | 5/2008 | Logan et al. | |
| 7,454,195 B2 * | 11/2008 | Lewis et al. | 455/412.1 |
| 7,467,183 B2 | 12/2008 | Arcuri et al. | |

(Continued)

OTHER PUBLICATIONS

Office Communication (Mail Date Mar. 31, 2010) for U.S. Appl. No. 11/867,151, filed Oct. 4, 2007, Confirmation No. 8507.

(Continued)

*Primary Examiner* — Ajay Bhatia
(74) *Attorney, Agent, or Firm* — Schmeiser, Olsen & Watts; Mark C. Vallone

(57) ABSTRACT

A method to dynamically create an adaptive distribution list through an application of a combination of mathematical, logical and/or programmable operations to existing static distribution lists or user directories. This list is created as part of the information message sent to the entries on the distribution list. In this invention, the user or sender does not need to interface with the Group creation modification tool. Another feature of the invention is that the newly created distribution lists can be temporarily or permanently saved as designed by the sender. This invention eliminates the need to separately create distribution and then send messages to the entries on the distribution list.

19 Claims, 6 Drawing Sheets

U.S. PATENT DOCUMENTS

| | | | |
|---|---|---|---|
| 7,590,548 | B2 | 9/2009 | Meyer et al. |
| 2002/0078052 | A1 | 6/2002 | Cheng et al. |
| 2002/0087534 | A1 | 7/2002 | Blackman et al. |
| 2002/0091773 | A1* | 7/2002 | Chowdhry et al. ............ 709/206 |
| 2002/0103873 | A1 | 8/2002 | Ramanathan et al. |
| 2003/0037114 | A1* | 2/2003 | Nishio et al. .................. 709/206 |
| 2003/0072488 | A1 | 4/2003 | Barsness et al. |
| 2004/0103162 | A1* | 5/2004 | Meister et al. ................. 709/206 |
| 2004/0199587 | A1 | 10/2004 | McKnight |
| 2005/0010645 | A1 | 1/2005 | Arshi et al. |
| 2005/0153686 | A1 | 7/2005 | Kall et al. |
| 2006/0031328 | A1 | 2/2006 | Malik |
| 2006/0075036 | A1 | 4/2006 | Malik |
| 2006/0143276 | A1* | 6/2006 | Phillips et al. ................ 709/206 |
| 2006/0168057 | A1 | 7/2006 | Warren et al. |
| 2007/0005708 | A1 | 1/2007 | Juliano |
| 2007/0050456 | A1* | 3/2007 | Vuong et al. .................. 709/206 |
| 2007/0143472 | A1 | 6/2007 | Clark et al. |
| 2007/0261099 | A1 | 11/2007 | Broussard et al. |
| 2008/0162652 | A1 | 7/2008 | True et al. |
| 2008/0177994 | A1 | 7/2008 | Mayer |
| 2009/0094240 | A1 | 4/2009 | Bordeaux et al. |
| 2009/0119377 | A1* | 5/2009 | Lynch ............................ 709/206 |
| 2009/0182820 | A1 | 7/2009 | Hamilton, II et al. |
| 2010/0049807 | A1 | 2/2010 | Thompson |
| 2010/0077053 | A1* | 3/2010 | Haffner ......................... 709/206 |

OTHER PUBLICATIONS

Notice of Allowance (Mail Date Jul. 13, 2010) for U.S. Appl. No. 11/867,151, filed Oct. 4, 2007, Confirmation No. 8507.

Office Communication (Mail Date: Jul. 26, 2010) for U.S. Appl. No. 12/013,525, filed Jan. 14, 2008, Confirmation No. 8801.

Murray, Katherine; Chapter 2: Microsoft Office Outlook 2003 and Messaging; Published Mar. 26, 2003; [online]. <URL: http://www.microsoft.com/mspress/books/sampchap/6529.aspx#122>. 11 pages.

D. L. Manager; Copyright 1998-2009 Geisel Envisioning International Ltd. [online]. Retrieved from the Internet Sep. 29, 2009. <URL: http://www.madsolutions.com/DL/Version5.0/WhatsNew.htm>. 1 page.

Microsoft® Systems Management Server (SMS); Chapter 4: Managing Collections and Queries; 2003; [online]. <URL: http://spa.its.uiowa.edu/ecm/imaging/SMS/Managing%20Collections%20and%20Queries.pdf>. pp. 96-124.

Microsoft® TechNet ; Chapter 11—Managing Collections and Queries; 2009; [online]. <URL: https://www.microsoft.com/technet/prodtechnol/sms/sms2/proddocs/smsadm/part3/smsad11.mspx?mfr=true>; 20 pages.

U.S. Appl. No. 11/867,151, filed Oct. 4, 2007; First Named Inventor Rick Allen Hamilton et al, Confirmation No. 8507.

U.S. Appl. No. 12/013,525, filed Jan. 14, 2008; First Named Inventor Rick Allen Hamilton et al, Confirmation No. 8507.

Notice of Allowance (Mail Date Oct. 13, 2010) for U.S. Appl. No. 12/013,525, filed Jan. 14, 2008, Confirmation No. 8801.

Notice of Allowance (Mail Date Dec. 20, 2010) for U.S. Appl. No. 12/944,216, filed Nov. 11, 2010, Confirmation No. 5287.

U.S. Appl. No. 12/944,216, filed Nov. 11, 2010, Confirmation No. 5298.

\* cited by examiner

102 — 104

| Steve Smith | |
| James Jones | |
| Sue Day | |
| Jane Kate | |
| Sam Wall | |
| Jan Lane | |

Send

From:

To: ———204

Add CC   Add BCC   Add +   Add -   Add +=   Add -+

Subject:

202

Cancel

FIG. 2

METHOD FOR CREATING ADAPTIVE DISTRIBUTIONS

FIELD OF THE INVENTION

The present invention relates to a method for generating distribution lists for the purpose of distributing information to entries on the list and in particular, this invention relates to a method for automatically modifying a distribution list or automatically generating a new distribution list as part of an instruction contained in a command to distribute information to entries on an distribution list.

BACKGROUND OF THE INVENTION

Advancements in technology have made the distribution of information a more convenient task. Computer networks, satellites, telephone systems and communication networks such as the Internet provide many tools to communicate information. As a result of the ability to conveniently distribute information, organizations have incorporated these technology advancements into their operations. One tool used in the mass distribution of information is to have distribution lists. These lists contain several names or entries that simultaneously receive information from a source. A side effect of the increasing number of potential data recipients is the difficultly in coordinating data delivery to a wide audience, e.g., a large number of recipients. Towards this end, distribution lists, or "mailing lists" in an electronic document context such as E-mail, have been developed to facilitate grouping and tracking recipients.

A key in the ability to mass distribute information is the distribution list. The creation of these lists can be a tedious and/or complex manual task, since there may be many list members requiring processing for entry on to the list. Some of these lists are manually created and other lists are automatically created based on characteristics of an environment, e.g., a "customers" list may refer to all customers of a computing system. However, regardless of how the list is created, on occasion it may be useful to send data to only some members of a particular distribution list, rather than all members or class of members of the list. Similarly, it may be useful to aggregate several distribution lists, which may have been manually, or automatically determined, and then exclude some members or class of members from the combination of lists.

To send messages to a portion but not all of a distribution list, usually a subtractive message is performed based at least in part on an intersection of various distribution lists to determine, if only temporarily, a new distribution list for a message. A particular distribution list may respectively be combined or intersected with an additive or a subtractive distribution list. Thus, for example, an e-mail message may be addressed to a distribution list for all employees, but where a subtractive list is applied to remove certain employees from receiving the e-mail message. The distribution list for all employees need not be altered.

Traditional static distribution lists and dynamic distribution lists do not provide the features commonly needed in a multitude of usage scenarios. Static distribution lists consist of predefined group names with manually added email addresses as the group members. Dynamic distribution lists are lists that are generated by performing a look-up in a directory on some common key. There are several usages of distribution lists that are not efficiently addressed using present static or dynamic distribution lists. The present state of distribution lists does not provide the following functionality: (1) Permanent and temporary modification of static distribution lists from a message destination field; (2) Temporary modification of static or dynamic distribution lists with a temporal restriction from a message destination field; and (3) Creation of temporary or permanent distribution lists by combining static or dynamic distribution lists using a variety of mathematical, logical and programmable operations, and temporal restriction.

Current technology has addressed the problem of modifying distribution lists. U.S. patent application, publication number 2005/0010645 provides a method in which additive and subtractive message operations can be performed on a distribution list based at least in part on an intersection of various distribution lists to determine, if only temporarily, a new distribution list for a message. A particular distribution list may respectively be combined or intersected with an additive or a subtractive distribution list. Thus, for example, an e-mail message may be addressed to a distribution list for all employees, but where a subtractive list is applied to remove certain employees from receiving the e-mail message. The distribution list for all employees need not be altered. Although this method does provide a means to modify a distribution list, this method is limited and does not provide any features to temporarily alter an existing distribution list that lasts for a given period of time according to the user's will. For example, if Mary Joe is having a leave of absence for 1 year, and she does not need to be on the "Women Network" distribution list for 1 year, this referenced invention does not provide a solution to address this problem. Instead, it would need to create a subtraction distribution list that contains Mary Joe as the only member and then perform the subtraction of the subtraction distribution list from the "Women Network" distribution list. If a user needs to send emails to the Women Network multiple times, this subtraction operation is needed to be performed by the user every time when he/she sends the email to the "Women Network". It is not flexible and troublesome to do so if the frequency of emailing the "Women Network" increases. On the other hand, the user has to manually manage the subtraction distribution list, or it would waste extra disk space to store it if the user does not need this subtraction distribution list anymore. It does not manage any duration of distribution lists. Also, this method does not provide the means for incorporating dynamic decision-making capabilities for determining whether to save a newly generated distribution list.

There remains a need for an advanced method for generating flexible and adaptive distribution lists to fit different daily situations, allowing the user to dynamically determine whether to store either temporarily or permanently the newly created distribution list with an easy to use user-interface, and freeing them the effort of manually managing the duration of the distribution lists.

SUMMARY OF THE INVENTION

This method of the present invention describes a method to dynamically create an adaptive distribution list through an application of a combination of logical operations and programmable operators to existing static distribution lists or user directories. Another feature of the present invention is that user does not need to interface with the Group creation modification tool. This invention enhances current art with the ability to add situational business flexibility, nested grouping capabilities and enable dynamic updates to a predefined distribution list from a message destination field.

The disclosed methods enable temporary or permanent modification of existing distribution lists from information contained in a message destination field of a transmitted message. Such modifications are often needed when peers are part of a distribution list but presently unavailable, and the subject matter under discussion is time sensitive. In such cases, including those peers in the distribution provides no benefit and only unnecessary costs. If a permanent modification of the existing distribution list is not necessary, this invention provides the ability for temporary modification of a static or dynamic distribution list, which the user provides a defined temporal restriction for each included new member or excluded existing member from a message destination field. A temporal restriction refers to a time duration specification with a starting and ending date and time. A static distribution list refers to a distribution list with predefined members. A dynamic distribution list refers to a distribution list which members are not defined by the end users on the client side of the application; instead an end user would need to look up the members of the dynamic list that are stored on the server side.

In addition, there could be cases where the user can permanently or temporarily save the newly created distribution list. In this case, this invention also provides the capability to create a new distribution list from a message destination field, and give the user options to save the new distribution list permanently, or temporarily within a specified period of time. For example, the user can save the newly created distribution list into a new distribution list named "New Women Network" permanently, or even just for the period of Aug. 1-31, 2007. If the user determines to save the newly created distribution list temporarily, then the duration of this temporary distribution list will be managed automatically. In this example, the "New Women Network" distribution list will be deleted automatically on Sep. 1, 2007. In addition, in any case where a temporary element is associated with any newly included or excluded member, the user does not need to manually manage the duration of individual membership in the distribution list. Instead, members within the distribution list that are associated with a temporary element will be managed automatically by the application. For example, if Mary Joe, who belongs to the "Women Network" distribution list, is temporarily excluded from receiving messages for 2 weeks until Aug. 31, 2007, then the application will remove the temporary element from associating with Mary Joe on Sep. 1, 2007. In another example, if Jane Smith is temporarily included to the "Women Network" distribution list during Aug. 15-31, 2007, then the application will remove Jane Smith from being the member of the "Women Network" on Sep. 1, 2007.

Additionally, methods are disclosed to enable dynamic formation of new distribution list based on nested layers of existing distribution list.

The invention includes methods to use mathematical, logical, and programmable operations to create an adaptive distribution list that addresses situational needs of the sender and recipients. Note that such adaptive distribution list as defined here could be used in conjunction with any kind of electric communication methodologies.

Mathematical operations include and not limited to:
 "+" for addition, i.e., add a user to the group;
 "−" for subtraction, i.e., remove a user from the group.
Logical operations can be and not limited to:
 UNION—for union of multiple sets,
 XOR—for exclusive OR operation.
Programmable operations can be and not limited to:
 "=" for assignment
 "lookup" for looking up a certain predefined object
 "like 'sss'" for retrieving recipient's name that matches the string "sss".

The invention is a combination of known techniques in a non-obvious manner, as well as the creation of new techniques. The known elements, which are combined, are collaboration software and dynamic distribution lookups. The new techniques include the application of mathematical symbols to distribution lists, set operations upon distribution lists, applying temporal restrictions to a subset of recipients in a distribution list and/or to the whole distribution list, applying programmable operations and creation of distribution lists from a message destination field. The added flexibility of the present invention to existing technology with regard to the creation and modification of distribution groups allows senders to modify existing, defined groups and allowing them to have the options not to save the changes, or save the changes temporarily or permanently. If the operator does wish to save changes, the "=" operation provides the means. The present invention also allows for efficient creation of distribution lists, and provides means to automatically manage the duration of temporary membership or the whole entire temporary distribution list.

DESCRIPTION OF THE DRAWINGS

FIG. 1 is an illustration of a distribution list for a group of six people in an organization.

FIG. 2 is a screen of a device (a computer screen) used for transmission of information to entries on a distribution list.

DETAILED DESCRIPTION OF THE INVENTION

Figure 3A:
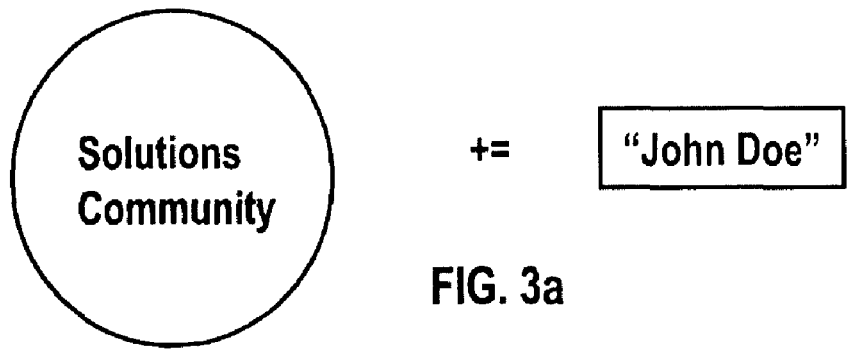
FIGS. 3a, 3b, 3c and 3d are illustrations of distribution list modifications and distribution list creations using set operations.

The present invention provides a method and system for creating and/or modifying distribution lists used for mass distribution of information to entries on the distribution list. This method can apply to any form of distribution for example email messages, instant messages or telephone messages. Although there can be various applications of the technology described in the present invention, the application used for the purpose of describing the invention will be an electronic mail application.

FIG. 1 is an example of a typical distribution that many organizations use to mass transmit information. This list could be for a work group called "Solution Community". This list has six entries. Each entry can comprise a record and can have various fields 102 (for the entrant name) and other fields 104 that contain specific information about the entrant.

Using the distribution list in FIG. 1, with conventional or existing technology, if a sender wants to send messages to the entrants in this distribution list for this group "Solution Community", and for example, exclude a member of that group, for example Jane Kate, from receiving the message, the sender would need to perform these steps:
1) Select the "Group" tool (This tool tells the process that the information is to go to a distribution list. This selection can be through a "Group" icon on the computer screen. Selecting the Group icon could activate this Group tool.)
2) Selects the group "Solutions Community" (This step locates the particular distribution list "Solutions Community".) This list would be in stored in some storage location.
3) Remove Jane Kate from the member list. (The user would need to go in and remove this name from the list, if the intent of the sender was to not send this message to Jane Kate. Save the changes. This is a permanent modification of the existing distribution.
4) Select the "Compose Message" tool (At this point, the sender would compose the message that is to be sent to the entries on the Community Solutions distribution list.
5) Type the group "solution Community" in the "TO" portion of the message header. As a result of the editing of the Solution Community distribution list, Jane Kate would not receive the message.

As one can observe, this conventional method requires manually modifying an existing distribution list and making permanent modification to the list to exclude specified entrants. In the present invention, the steps for creating a message for the same scenario will be shortened. The sender will perform these steps instead:

Select the "Comprise Email" tool

Type this (or analogous message) in the destination field of the message header:

"Solution Community—Jane Kate"

This line "Solution Community—Jane Kate" identifies the distribution group as Solution Community. It identifies a subtraction operation, which means that the given entrant will be removed from the distribution list. "Jane Kate" defines the entrant to be removed from the distribution list and not to receive the distributed message. The method of this invention results in enhanced usability for collaboration tool by allowing ad hoc group modification/creation to be performed from the collaboration tool interface. Besides, from this example, there is no permanent modification to the existing distribution list as this modification only happens in runtime as the sender has not expressed his/her desire to make the modification permanently.

FIG. 2 shows a screen 200 that a sender may use to designate the distribution list and the sending or distribution requirements for the message. As shown, the screen appears to be a typical screen used to compose and send an electric mail message. The message area 202 provides the place for the sender to compose the message. The screen also has many features that are common to electronic mail systems. The "To" field 204 also referred to as the 'message destination field' provides place for the sender to input the destination location information. As previously mentioned, this field could contain the input "Solution Community—Jane Kate". The user can either type the input in the message destination field, or compose it by using the mathematical operations drop down menu and select the "−" operation. There are logical operations drop down menu, programmable operations drop down menu, and temporal restriction drop down menu. The user can compose his input for the message destination field by using a combination of operations from drop down menus as desired.

FIGS. 3a-3d illustrate various operations that are used to generate modified distribution lists in accordance with the present invention. As previously mentioned, the invention includes methods to use mathematical operations, logical operations, and programmable operators to create an adaptive group list that addresses situational needs of the sender and recipients.

FIG. 3a illustrates an addition mathematical operation "+". This operation is represented as: Solution Community+John Doe. In this operation, an additional entrant is added to a designated distribution list. In this FIG. 3a, entrant John Doe is not an original entrant in the "Solutions Community" distribution list. However, for this message transmission that name is added to the "Solutions Community" distribution and will receive the information along with the entrants in the "Solutions Community" distribution list. In FIG. 3a, the "+" operation is followed by a save operation that is represented by the "=" operation. The '=' operation indicates that the new distribution list will be assigned to the distribution list that is on the left hand side of the "=" operation, which is the "Solution Community" in this example. As a result of the "=" operation, the new distribution list will be permanently saved. That is to say, the "+=" operation can be expressed as a "+" or addition operation and can include the "=" or saved operation.

Figure 3B:
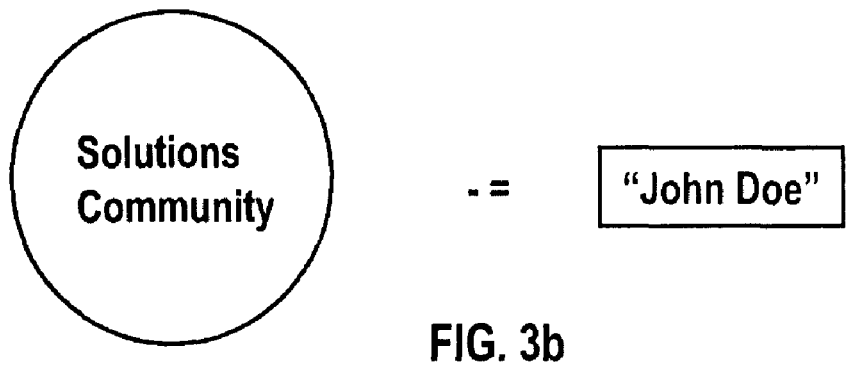

In FIG. 3b, entrant John Doe is initially an entrant in the "Solutions Community" distribution. In this case, a subtraction operation, "−", excludes or removes the John Doe entrant from the distribution list. The message will be transmitted to all entrants except John Doe or any other entrant designated to be excluded from the message transmission. Similar to FIG. 3a, the "−" or the remove operation is followed by a "=" or save operation in this example. The "=" operation indicates that the new distribution list will be assigned to the distribution list that is on the left hand side of the "=" operation, and changes will be saved permanently since there is no temporal restriction specified.

Figure 3C:
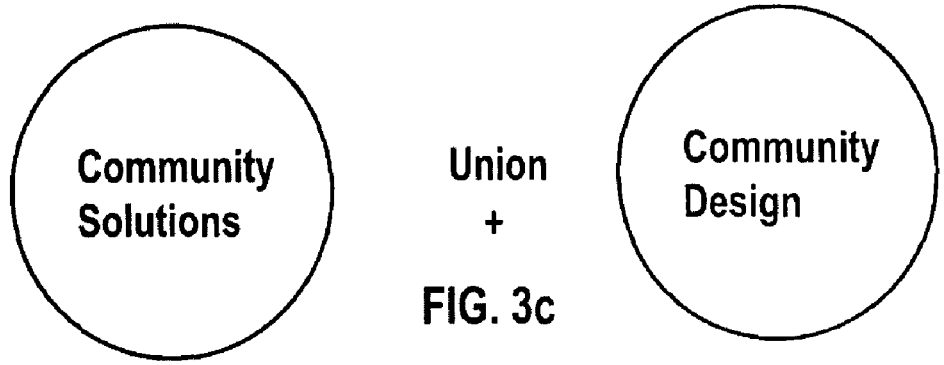

The present invention can also include logical or set theory operations. In FIG. 3c, a union operation combines the entrants of the distribution list "Solution Community" with the entrants from the "Community Design" distribution list. Please note that the union operation will not show any duplicated entrant after the combination of the two distribution lists. That is to say, assuming that John Doe is in the Solution Community distribution list as well as the Community Design distribution list, then the result of the union operation will only show one entry for John Doe in the newly combined distribution list. In this example, we have not seen the "=" operation which indicates that the save operation is not needed. As a result, the newly combined distribution list will not be saved. It is only executed once during run time, and the Solution Community and Community Design distribution lists remain unchanged.

If we use the "+" operation instead of the union operation in this example, that is to say, Solutions Community+Community Design, then the new distribution list will simply combine the existing entrants of the Solution Community and the entrants of the Community Design without checking for any duplication.

Figure 3D:
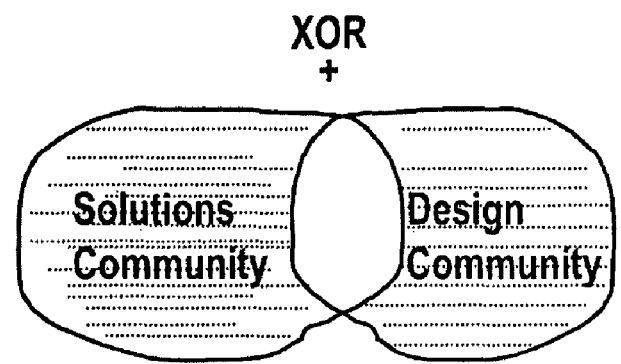

FIG. 3d illustrates the use of the exclusive XOR operation. This operation also involves multiple distribution lists. The result is that only the entrants that are in one or the other, but not both, of the distribution lists are desired.

In another example, there can be the use of temporal restrictions for including a new member to an existing distribution list. In this case, the designation field can contain: "Solution Community+Susan Brown (08-01-2007, 08-31-2007)". This indicates that Susan Brown is an additional member to the existing distribution list named "Solution Community" which only applies to the temporal restriction specified at the period from Aug. 1, 2007 to Aug. 31, 2007. Then on Sep. 1, 2007, Susan Brown will be automatically removed from the distribution list name "Solution Community".

Another example illustrates the use of temporal elements or restrictions for excluding an existing member of the distribution list from receiving messages during the given duration. In this example, "Solution Community−Jenny Jones (08-01-2007, 08-14-2007)" indicates that Jenny Jones who is an existing member of the distribution list named "Solution Community" will be excluded from receiving messages (by using the temporal restriction specified) from the period starting on Aug. 1, 2007 till Aug. 14, 2007. Then on Aug. 15, 2007, the temporary element associated with Jenny Jones will be removed and she will be included for future messages that are sent to the "Solution Community" distribution list from Aug. 15, 2007 and onwards.

Another application of the present invention is the use of temporary elements in the creation of a new distribution list. For example, "Aug Solution Community (08-01-2007, 08-31-2007)=Solution Community−Jenny Jones (08-01-2007, 08-14-2007)+Susan Brown (08-01-2007, 08-31-2007)" tells the following operations are taken place. First of all, the distribution list named "Aug Solution Community" is associated with a temporal restriction on the whole distribution list level that indicates the whole entire distribution list is temporary. If the application does not find any existing distribution list with the same name, the application detects that the list is new. The members of "Aug Solution Community" will consist of members from the existing members of the distribution list called "Solution Community" and exclude the member Jenny Jones for the period from Aug. 1, 2007 to Aug. 14, 2007, and include the member Susan Brown for the period from Aug. 1, 2007 to Aug. 31, 2007. Assuming the user enter the creation of this new distribution list in the message destination field on the date of Jul. 25, 2007. The distribution list will be created now on the date of Jul. 25, 2007 but it is only valid to be used from the period Aug. 1, 2007 till Aug. 31, 2007. That is to say, the message that the user entered that associated with the message destination field will not be delivered until the date is specified by the temporal restriction of the new distribution list given in the message destination field, which is Aug. 1, 2007. Therefore, the application will store the message in the system and marks that it is scheduled to be delivered on the start date specified by the temporal restriction of the distribution list. Then when the start date of the temporal restriction arrives, the application will deliver the message to the given distribution list. Any subsequent usage of this distribution list is valid between the dates specified by the temporal restriction of the distribution list. The user can take advantage of the temporal restriction of the whole distribution list to enter his message ahead of time, and the application will schedule the delivery of the message when the given start date of the temporal restriction of the distribution list arrives. Since the whole distribution list named "Aug Solution Community" is associated with a temporal restriction, its duration will end by the end date that it is specified. In this case, on Sep. 1, 2007, the "Aug Solution Community" will be deleted from the system. The user does not need to manually manage the duration of any distribution list that has a temporal restriction associated at the entire distribution list level.

Programmable operations can combine with the above mathematical and logical operations to produce other desired modified distribution list results. In this invention, the "=" operation is for an assignment. This operation saves the modified or created distribution list for a period of time beyond the distribution of the information to the entries on that newly created or modified list. This "=" will appear as part of the destination address in the "TO" or message destination field. Upon reading this symbol, the software interprets a save operation for the newly created or modified distribution list, which the changes will take effect for the name of the distribution list that is on the left hand side of the "=" operation. In addition, the detection of this symbol will also trigger other steps later in the process.

The "lookup" operation is for looking up a certain predefined default of specified object or criteria. With this "lookup" operation, the software of the present invention searches through a distribution list for entries that match the designated criteria. For example, the operation "lookup (CSI)" indicates a look up operation for the entry called "CSI" from a default user directory. Similarly, the operation "lookup (CSI, IBM_employee_directory) indicates a look up operation of the entry called "CSI" from the defined directory called "IBM_employee_directory"). The look up operation would require the user to have read access right to the directory, otherwise, the operation would fail and return an error message to the user. Another programmable operation example can be the criteria "like 'sss'". It identifies entries with a name that matches the string "sss".

Figure 4:
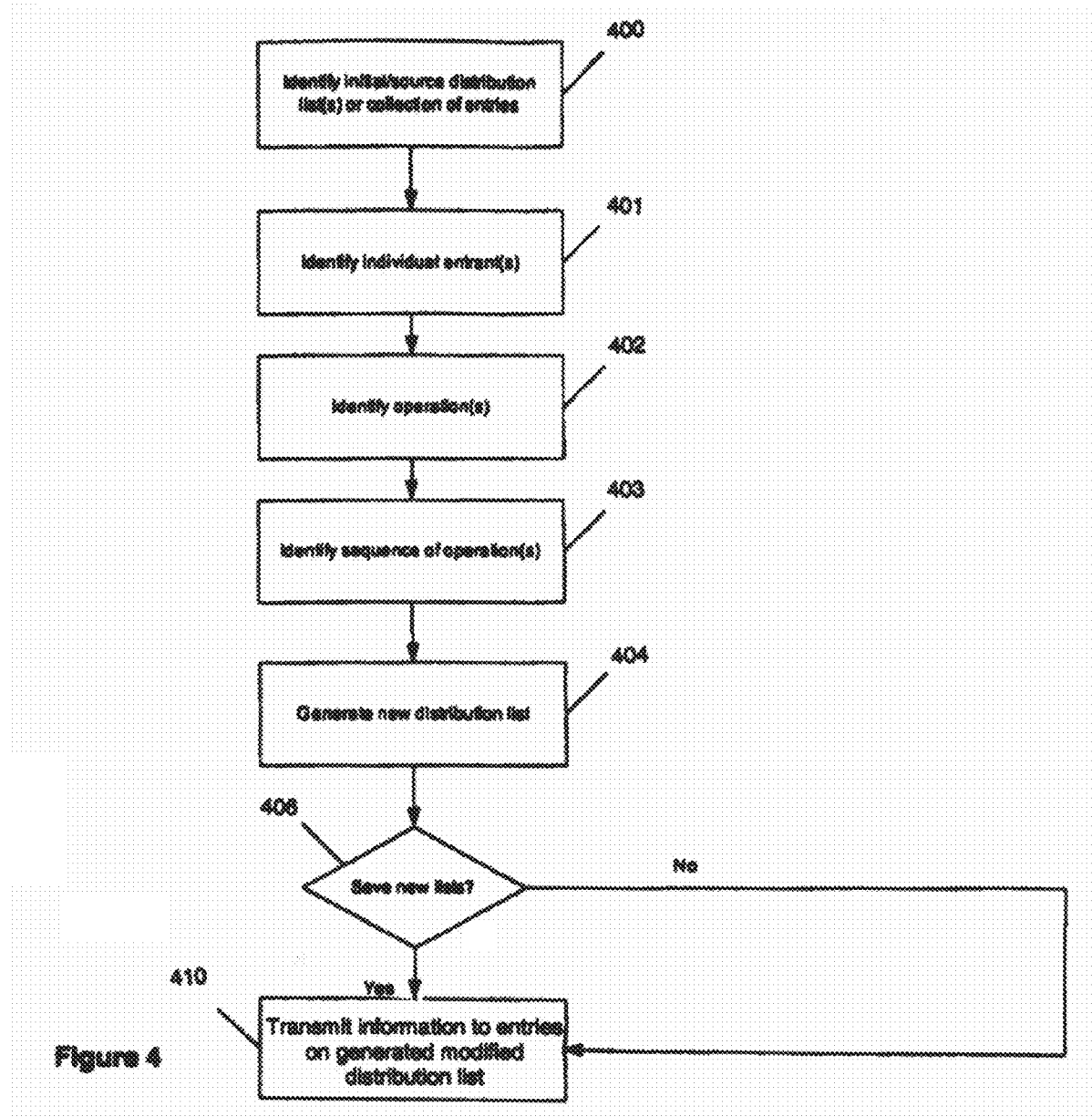
FIG. 4 is a flow diagram of a method in the implementation of an embodiment of the present invention.

FIG. 4 illustrates the general steps in the automatic creation and/or modification of distribution lists in accordance with the present invention. Step 400 determines or identifies an initial or source distribution list or a collection of entries from the information given at the message destination field. As with previous approaches, there has to be some directory or master list which one needs to have to create an initial list. For example, a directory of all employees or members of an organization can be the initial collection of entries from which one can generate a distribution list. Another example of a directory can be the local name and address book with distribution entries defined by the end users. In addition, there can be multiple sources of entries from which one can generate a distribution list. To illustrate the general steps in this figure, we can use this example "Solution Community−John Doe". The initial list or source distribution list in this case is the "Solution Community". In this step, the initial or source distribution list is identified as the "Solution Community". Step 401 identifies one or more individual entrants, which would be John Doe in this example. This step 401 can be an optional independent step as shown or it can be incorporated into step 400. Step 402 identifies the operations specified. In this example, there is one operation given, which is "−" operation. The "−" operation is a mathematical operation that indicates a subtraction or exclusion of the entrants followed by operation. Step 403 identifies the sequence of the operations with the given source distribution list(s), individual entrant(s) and operation(s). The sequence of operations is governed by the mathematical sequence of operations. In the "Solution Community−John Doe" example, there is only one operation, the "−" or exclusion operation. However, in other examples, there could be multiple operations specified. For example, assuming the message destination field contains the information "(Solution Community−John Doe) UNION Team A". The given parentheses indicates that the "Solution Community−John Doe should be executed first before the UNION operation. In another example "Solution−=John Doe" contains two operations: the "−" operation and the "=" operation. The "=" operation is the save or assignment operation should be performed last. In step 404, a new distribution list will be generated based the criterion information gathered from the message destination field, including the specified source distribution list, individual entrants, operations and the sequence of operation. This criterion is also the criterion for the entrants that will comprise the newly created or modified distribution list. At this time point, step 404 uses the criterion information to generate a new distribution list by searching the base directory or collection of entries for entries that match the distribution list criterion. As part of this step 404, the method retrieves the information that the sender puts into the message destination field. As previously mentioned, this message destination field not only contains distribution list criterion, but also a combination of mathematical, logical, or programmable operations and temporal restriction that instructs the method on what to do with an entry that matches the distribution criterion. For example, a "−" operation following the distribution list criterion tells the software that entries that match the criterion should be excluded from the distribution of entries that will receive the information. A resulting internal list would not include entries that matched the distribution list criterion. Step 406 determines if a save operation is needed. Save operation is identified if there is a "=" operation found in the message destination field. In the "Solution Community−John Doe" example, it does not contain any "=" or save operation. If step 406 determines that a save operation is not needed, the next step followed will be step 410 in which information will be transmitted to entries on the newly generated list. The newly generated list will not be saved in the system beyond the time after the information is transmitted to the recipients of the newly generated list. In another example, "Solution Community+=John Doe", the combination of operations "+=" tells the method to add identified entrants to an identified distribution list and then save the newly created list permanently and assign it to the distribution list that is on the left hand side of the "=" operation. This requires changing the content of the distribution list to the left hand side of the "=" operation, which includes updating the distribution in the physical storage of where the distribution list resides, such as a database, or flat files, etc. . . . This save operation, which is implemented in step 408 if step 406 determines that a save operation is needed, keeps the created list even after the distribution of the information to the entrants on the list. This save determination is made from information contained in the message destination field. As indicated, the detection of an "=" is an instruction to the method to save the result list either to an existing distribution list or a new distribution list that is on the left hand side of the "=" operation. If the name of the distribution list that is on the left hand side of the "=" does not exist, it indicates a new creation of a new name for a new distribution list. When the "=" is detected, the step 408 saves (i.e., stores) the list separate from the list or lists from which it was generated. If the sender does not indicate with the "=" operation that the newly list is to be saved, the process moves immediately to decision step 410 via the "No" branch from step 406. At this point, after the creation of the distribution list for the information, step 410 distributes the information to entries on the newly created list.

Figure 5:
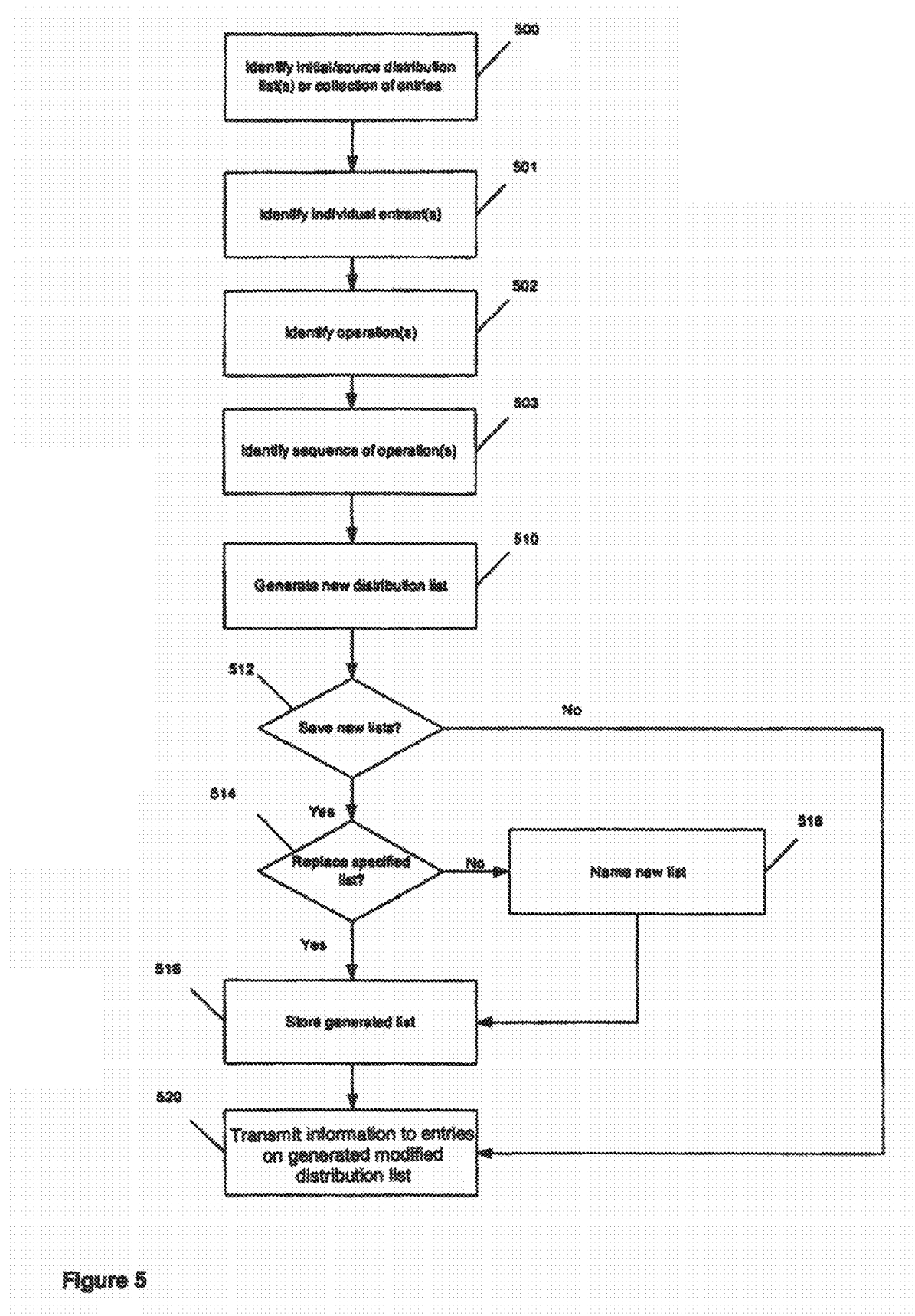
FIG. 5 is a flow diagram of the steps of the method of the present invention creating a new and permanent distribution list.

FIG. 5 is a more detailed flow diagram of the steps of the method of the present invention creating a new and permanent distribution list. Initially, the originator and sender of a message would enter address information into the message destination field. This address information would contain the identity of at least one distribution list and some mathematical, logical, or programmable operations to be performed on that list to generate the new distribution list. For example, the message destination field may read as follows: "Solution Community Core Team=Solution Community−John Doe−Jane Kate". (Further, after the sender prepared the message in the message area, the sender would send the message. This procedure is similar to conventional methods for sending messages. Once the sender has sent the message, the method of the present invention retrieves and further processes the message.) From the information in the message destination field, step 500 identifies the initial source distribution list or lists. For the above example, the source distribution list is "Solution Community". Step 501 identifies two individual entrants being John Doe and Jane Kate. Step 502 identifies the operations. There are two "−" operations and a "=" operation. Step 503 identifies the sequence of operations. The "=" operation, which indicates a save or assignment operation should be performed last. Therefore, the two "−" operations will be performed first. "Solution Community−John Doe" will be performed first, then the result will be used to perform the "−Jane Kate" operation. The generated list will be assigned as to the list called "Solution Community Core Team". Step 510 will generate a new distribution list based on the given source distribution lists, individual entrants, operations and sequence of operations from the previous steps. Step 503 that identifies the sequence of operations, that specifies the two "−" operations to be done first, followed by the "=" operation. The first operation, "−", tells the method to remove the entrant "John Doe" from the "Solution Community" distribution list. The second "−" operation tells the method to remove the entry "Jane Kate" from the distribution list. The new list will not contain John Doe and Jane Kate. The transmitted information will not go to John Doe and Jane Kate. The third operation, "=" is a save operation. At this point, the generation of the new distribution list is complete.

Step 512 determines whether or not to save the newly created distribution list. Again, this determination is made based on information in the distribution field. The "=" indicates whether or not to save the newly created distribution list. When the determination is to save the newly created list, step 514 determines the user wants to save the list as a new list or to replace an existing list. If the determination is to replace an existing list, then that list is identified and method moves to step 516 which stores the generated list. If in step 514, the determination is to not replace any existing list, then the method moves to step 518, which identifies this list as a newly created distribution list. A new name will be created for a new distribution list. The method then moves to step 516, which stores the newly created list as named to the left of the '=' operation or identifier. In this example, the "=" operation indicates that the sender has the desire to save the newly generated list in step 512. The newly created list is assigned to the list specified on the left hand side of the "=" operation, which is the list called "Solution Community Core Team". Step 514 determines if the generated list is to be replaced any existing list. If the Solution Community Core Team exists, this generated list will replace the existing list called the "Solution Community Core Team" upon the completion of the transmission of information to the entrants on the list; then the existing "Solution Community Core Team" will be replaced in Step 516. However, if the "Solution Community Core Team" does not exist, a new list with this specified name will be created in step 518. The new list will contain the members of the newly generated list in Step 516. At this point, the new distribution list has been created and step 520 transmits the information to the entrants on the newly created list. Per an intent of the present invention, as part of this information transmission process, a new distribution list has been created. This new list can be used for other purposes and other distributions in a manner similar to previously created distribution lists. Convention distribution techniques are only used to generate list to send out a particular piece of information, but are not used as a method to generate new distribution list for used beyond an initial distribution of information. The present invention could be a way to send a new message informing a new list of recipients that are made of the combination of various source distribution list and individual entrants with given criteria while simultaneously creating a new distribution list for that group. Both objectives could be accomplished in one action.

Figure 6:
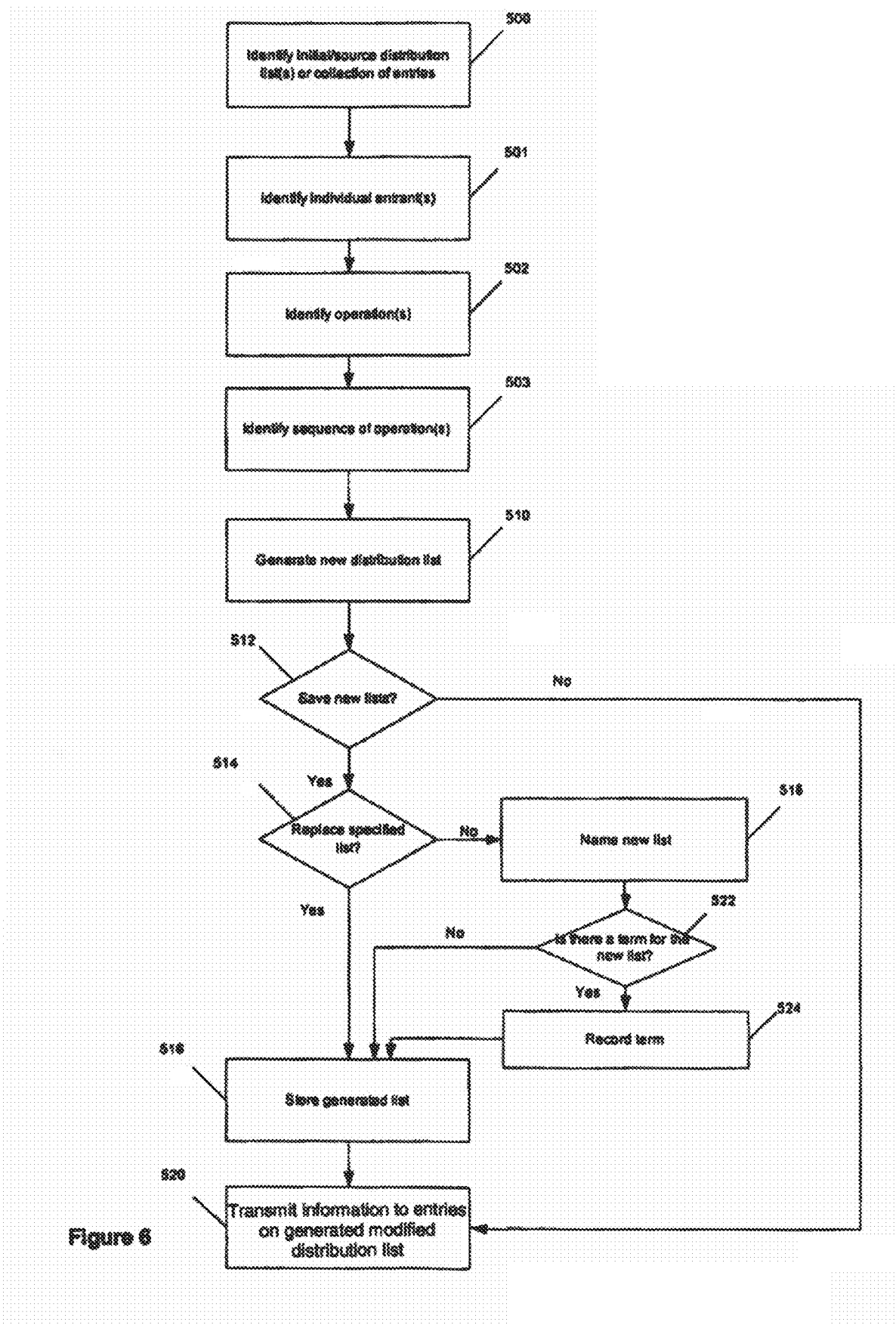
FIG. 6 is a flow diagram of the steps of the method of the present invention with the capability to determine whether a newly created distribution list will be used for one transmission only and not saved, will replace and existing distribution list, or will be created as a new temporary or permanent distribution list.

FIG. 6 is a more detailed flow diagram of the steps of the method of the present invention creating a new and temporary distribution list. This method is similar to the method described in FIG. 5 down to step 514 where there is a determination not to replace an existing list. The process moves to step 518, which identifies the list as a newly created list. In step 522, there is next a determination of whether the newly created list is a permanent list or a temporary list. This determination can be made from information in the message destination field. For example, the sender can specify the recipients of the message to be distributed to the "Solution Community Core Team (now to Feb. 21, 2008)=Solution Community–John Doe–Jane Kate" in the message destination field. In this example, the list called "Solution Community Core Team" is to be saved from "now", that indicates the current time, until Feb. 21, 2008. Therefore, this information in the destination field indicates the term of the newly created list. Step 524 records this term. The list is then stored with an indicator that it has a limited time to be stored. This new temporary list is named "Solutions Community Core Team" as specified. During the term of the new list, any message sent to Solutions Community Core Team would not contain the members John Doe and Jane Kate. The method of the invention will then monitor the duration of this temporary list. The end date of the "Solution Community Core Team" distribution list is specified to be Feb. 21, 2008. Therefore, on Feb. 22, 2008, the duration of this temporary list expires, and it will be deleted automatically. The sender does not need to manage the deletion of any temporary distribution lists.

Figure 7:
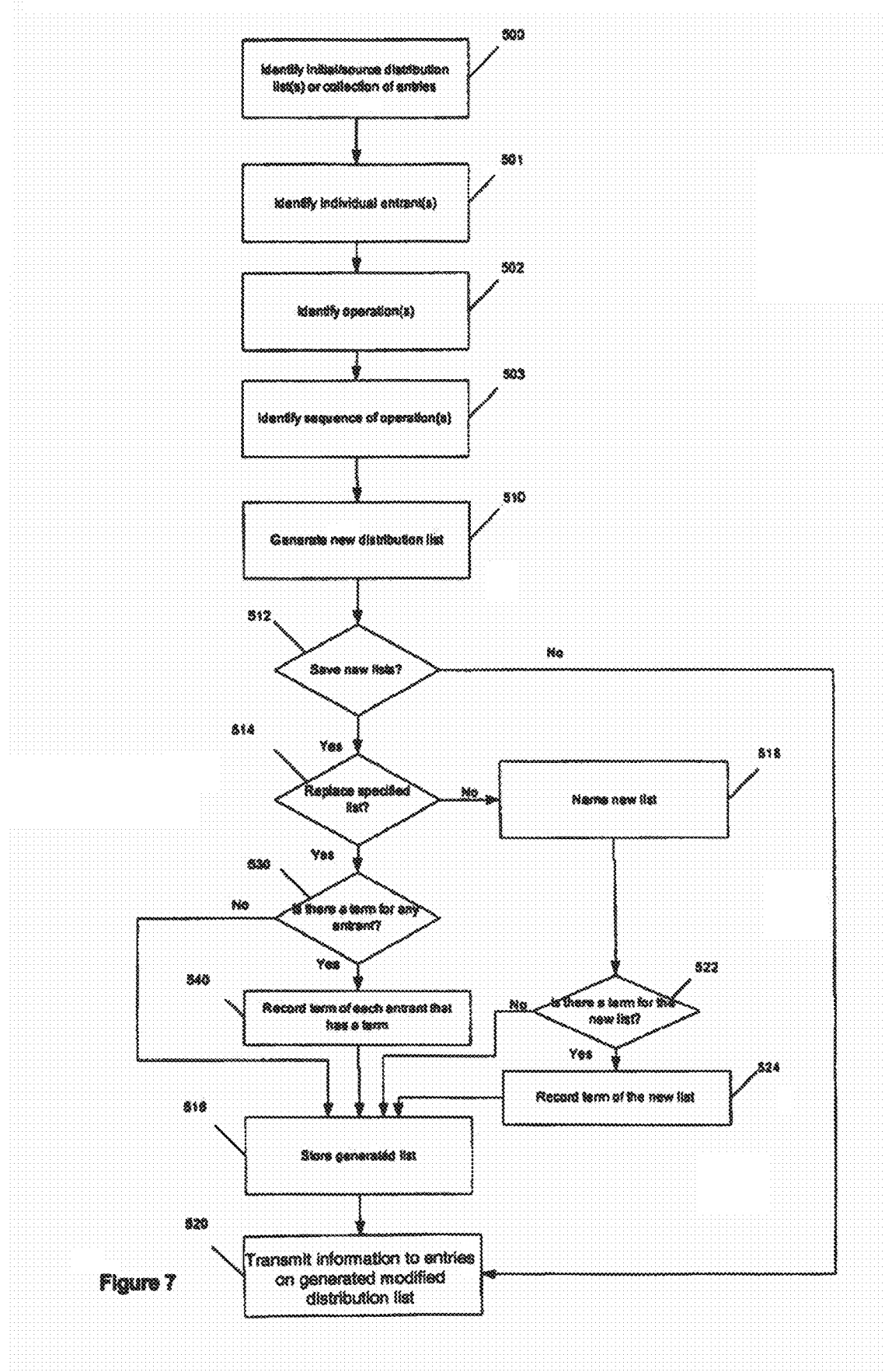
FIG. 7 is a flow diagram of the steps of the method of present invention illustrating the management of temporary membership of entrants belonging to an existing distribution list.

FIG. 7 is a more detailed flow diagram of the steps of the method of the present invention managing temporary membership of an existing distribution list. This method is similar to the method described in FIG. 6 down to step 514 where there is a determination not to replace an existing list. To illustrate this diagram, the example "Solution Community–=John Doe (now to Aug. 31, 2007)" is used. The sender has specified to replace the existing list named "Solution Community" with the generated list. Then it follows by step 530, there is next a determination of whether there are any individual entrants that have temporal restrictions. In this case, the individual entrant named John Doe will be excluded from the distribution list of the "Solution Community" for the duration of the current time to Aug. 31, 2007. In step 540, the duration of the entrant named John Doe will be monitored in the "Solution Community" distribution list. The modification of excluding John Doe from the Solution Community is temporary; it is valid only from the current time to Aug. 31, 2007. The generated list will not contain John Doe. In step 516, the generated list will be assigned to the existing list name "Solution Community" and then stored with an indicator that it has a limited time to be stored for one or more of its entrants. Traditional distribution lists have static membership without any specification of time restriction on any of its members. This invention gives flexibility to users to create temporary members that are either to be included to or excluding from an existing distribution list.

The present invention provides for the combining of separate distribution lists into one distribution list. Another advantage of this method is that it provides support for nested distribution groups. For example, "ACT team=CSI+Design Center" will allow the ACT team to be the parent of CSI and the Design Center assuming that both CSI and the Design Center are existing defined groups. Below is an example demonstrating the relationship between nested groups:

Group name: ACT Team
Members: CSI, Design Center
Group name: CSI
Members: janekate@us.xyz.com, sueday@us.xyz.com, samw@us.xyz.com.
Group name: Design Center
Members: steves@us.xyz.com, janlane@us.xyz.com, jamesj@us.xyz.com.

If there are any changes in the CSI members or the Design Center members, the ACT team may be automatically updated. This is different from current group distribution, in which members of a group are limited to the individuals, not groups.

As previously described, the invention comprises a unique ability to create a new distribution group from the message destination field. For example, when a sender is creating a distribution list in the message destination field, the sender can use a combination of the mathematical, logical and programmable operations and temporal restrictions to create a new distribution list. Example usages provide the easiest means to communicate the power and novelty of this invention.

Example 1

Usage Scenario: Sue is the sender. Jane belongs to Sue's distribution group called "Solution Community." Jane is on vacation for 3 weeks and she does not need to be involved for meetings or discussions while she is out. So Sue can enter something like this on the "TO" message destination field.

Message Destination Field Entry: "Solution Community–=Jane Kate (now to Feb. 21, 2007)"

Result Description: FIG. 7 would apply to this scenario. The sender specifies the recipients of the message in the message distribution field to be the existing members of an existing distribution list named "Solution Community" and excludes one entrant called "Jane Kate" from the current time to Feb. 21, 2007. Since the sender has indicated that the generated list will be saved to the existing list named "Solution Community", Jane Kate will be excluded from receiving any follow-on messages that are addressed to the Solution Community duration the duration specified. However, Jane is still part of the Solution Community group. Once the specified temporal restriction for Jane Kate expires, the time restriction will no longer be valid and Jane Kate will be able receive messages that are sent to the Solution Community.

Example 2

Usage Scenario: Sue wants to add John Doe to her existing Solution Community distribution group.

Message Destination Field Entry: "Solution Community"+="John Doe"

Result Description: This uses the math addition symbols "+=" to add John Doe to the message and also permanently add John Doe as the new member of the distribution list of Solution Community in the current message as well as add him to the Solution Community from now on. FIG. 4 applies to this example. The existing distribution list named "Solution Community" will be assigned to the generated list after the new member John Doe is added. Since there is no temporal restriction associated with the entrant John Doe, the addition of this new member is permanent.

Example 3

Usage Scenario: Sue wants to create a new group called "ACT Team" which includes the CSI team and Design Center team. Both CSI and the Design Center team members are listed in the company's user directory.
Message Destination Filed Entry: "ACT Team "="lookup (CSI)"+"lookup(Design Center)"
Result Description: This entry will dynamically look up from a predefined directory, such as the company's user directory or some sort of master directory from a server, on the members of the organization called "CSI", and dynamically look up from a predefined directory on the members of the organization called "Design Center", and include the members of CSI and members of Design Center to the message. Additionally, it will assign these two groups to the distribution list of ACT Team from now. If the "ACT Team" distribution list doesn't exist, it will create one.

Example 4

Usage Scenario: Sue wants to send a message to the existing members of Solution Community group and the CSI team (without any duplication).
Message Destination Field Entry: "Solution Community" UNION "lookup (CSI)"
Result Description: This will return the union (without duplication) of the list of members from the existing distribution list from the Solution Community group and the CSI team based on looking them up from a predefined directory. Note that the difference between the "+" and the UNION operation is that UNION can be upon distribution lists while the "+" operation can used to add individual entrants. Both operations guarantee no duplication. Also the generated list will not be saved beyond the time when the message is transmitted, and no distribution group name is supplied.

Example 5

Usage Scenario: Sue would like to only send a message to all females from the CSI team for a secret girls-only party.
Message Destination Field Entry: (Sex="Female") SUBSET_OF(lookup ("CSI"))
Result Description: The resulting set of the receipts is the list of females who are subset of the CSI team. This assumes that the gender attribute is available from the existing user directory. Similarly, other attributes such as age, job responsibilities, etc can be used.

Example 6

Usage Scenario: Sue would like to send a message to a list of users who only belong to either the Solution Community group or the CSI team, not both.
Message Destination Field Entry: "Solution Community" XOR lookup("CSI")
Result Description: This entry will return members of the Solution Community and CSI but not the members that are on both of the teams.

Example 7

Usage Scenario: Sue would like to send a message to all coworkers in her division that have the same last name.
Message Destination Field Entry: (lastname like "Li") SUBSET (lookup("STG"))
Result Description: This will perform a lookup within STG of all the employees' names and then filter a subset of people whose last name is 'Li'. Note that we can also use '*li' or '*li*' to filter the last names that ends with "li", or start with "Li", or have "li" in them.

In the system of the present invention, there is a database of entrants from which new distribution lists can be generated. These newly generated lists can be a combination of current distribution lists and/or individual entrants. Entries can be stored in the database in various forms and each entrant can have a record with fields that identify various features of the entrant that can be used in the process of generating new distribution lists. The system also contains an input/output device through which the user originators electronic messages for distribution. The user also inputs specifications for generating new distribution lists. The ability to generate specifications is through a software module that can be contained in the input/output device. This software module contains logic operations for generating new distribution lists. The input/output device is connected to recipient devices through a communication network. The connection of the input/output device to the communication network can be facilitated through a server device. This server device has the capability to detect and intercept messages transmitted from the input/output device. Once the message is intercepted, a new distribution list can be generated from information contained in a message destination field of the transmitted message.

To those skilled in the art, it is observed that this invention may have variations, such as: Different mathematical operators may be chosen to represent either the same or different operations defined in this disclosure; Other algebraic or set theory operations may be applied to distribution groups; and Different grouping operations may be used.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

What is claimed is:

1. A method for generating a distribution list prior to the transmission of information, wherein the generated list is based on the contents of information contained in a message destination field of a message containing the information to be transmitted, the method comprising the steps of:

detecting and intercepting a message transmission attempt;
identifying, from the contents of the information contained in the message destination field of the message, one or more sources of entrants for a distribution list;
identifying one or more operations needed for generating a new distribution list from the contents of the information in the message destination field;
generating the new distribution list based on the application of identified operations to the one or more identified sources of entrants according to a specified order of the identified operations;
determining storage requirements for the newly generated distribution list, the storage requirements being based on contents of the information in the message destination field; and transmitting the intercepted message to entries in the newly generated distribution list,
wherein said generating the new distribution list comprises performing mathematical, logical, and/or programmable operations, said logical operations including UNION and XOR set operations.

2. The method of claim 1, wherein said initial distribution list identifying step further comprises the step of determining whether the one or more sources of entrants comprise multiple distribution lists and/or individual entrants from which a new distribution list will be generated.

3. The method of claim 1, wherein the storage requirements require the new distribution list to be permanently or temporarily stored.

4. The method of claim 1, wherein said determining storage requirements comprises:
permanently replacing an existing distribution list with the newly generated distribution list in response to a specification by a user of the contents of the information in the message destination field.

5. The method of claim 1, wherein said determining storage requirements comprises:
determining that the newly generated list is to be stored for a period of time beyond a time to distribute the transmitted information to each entry in the newly generated list;
identifying an existing distribution list that is to be replaced by the newly generated distribution list for the period of time; and
temporarily replacing the existing distribution list with the newly generated distribution list in response to a specification by a user of the contents of the information in the message destination field.

6. The method of claim 1, wherein the contents of the message destination field comprise: (I) contents for identifying the one or more sources of entrants for the newly generated distribution list; and (ii) an identification of operations for generating the new distribution list and information for determining whether to save the newly generated distribution list.

7. A method for generating a distribution list prior to the transmission of information, wherein the generated list is based on the contents of information contained in a message destination field of a message containing the information to be transmitted, the method comprising the steps of:
detecting and intercepting a message transmission attempt;
identifying, from the contents of the information contained in the message destination field of the message, one or more sources of entrants for a distribution list;
identifying one or more operations needed for generating a new distribution list from the contents of the information in the message destination field;
generating the new distribution list based on the application of identified operations to the one or more identified sources of entrants according to a specified order of the identified operations;
determining storage requirements for the newly generated distribution list, the storage requirements being based on contents of the information in the message destination field; and
transmitting the intercepted message to entries in the newly generated distribution list,
wherein said determining storage requirements comprises:
determining that the newly generated list is to be stored for a period of time beyond a time to distribute the transmitted information to each entry in the newly generated list;
identifying an existing distribution list that is to be replaced by the newly generated distribution list for the period of time; and
temporarily replacing the existing distribution list with the newly generated distribution list in response to a specification by a user of the contents of the information in the message destination field,
wherein said determining storage requirements further comprises the steps of:
identifying temporal restrictions associated with the initial distribution lists and/or individual entrants that will be included or excluded temporarily within a specified start and end date pertaining to the period of time;
tagging the temporal restrictions as non-permanent; and
recording the period of the time in relation to the temporal restrictions.

8. The method of claim 7, said method further comprising the step of monitoring a time duration of the newly generated distribution list and terminating the newly generated distribution list when the time duration of the newly generated distribution list has expired.

9. A computer program product, comprising a tangible computer-readable storage device having a computer readable software stored therein, said computer readable software containing instructions configured to be executed by a server device to implement a method for generating a distribution list prior to the transmission of information wherein the generated list is based on the contents of information contained in a message destination field of a message containing information to be transmitted, said method comprising the steps of:
detecting and intercepting a message transmission attempt;
identifying, from the contents of the information contained in the message destination field of the message, one or more sources of entrants for a distribution list;
identifying one or more operations needed for generating a new distribution list from the contents of the information in the message destination field;
generating the new distribution list based on the application of identified operations to the one or more identified sources of entrants according to the specified order of the identified operations;
determining storage requirements for the newly generated distribution list, the storage requirements being based on contents of the information in the message destination field; and
transmitting the intercepted message to entries in the newly generated distribution list,
wherein said generating the new distribution list comprises performing mathematical, logical, and/or programmable operations, said logical operations including UNION and XOR set operations.

10. The computer program product of claim 9, wherein said determining storage requirements comprises:
determining that the newly generated list is to be stored for a period of time beyond a time to distribute the transmitted information to each entry in the newly generated list;
identifying an existing distribution list that is to be replaced by the newly generated distribution list for the period of time; and
temporarily replacing the existing distribution list with the newly generated distribution list in response to a specification by a user of the contents of the information in the message destination field.

11. The computer program product of claim 9, wherein the contents of the message destination field comprise: (I) contents for identifying the one or more sources of entrants for the newly generated distribution list; and (ii) an identification of operations for generating the new distribution list and information for determining whether to save the newly generated distribution list.

12. A system for generating a distribution list prior to the transmission of information, wherein the generated list is based on the contents of information contained in a message destination field of a message containing the information to be transmitted, the system comprising:
   an input/output terminal device for electronically constructing and transmitting messages to a designated destination location;
   recipient terminals devices connected to said input/output terminal device to receive electronically constructed and transmitted messages;
   a communication network for connecting terminal devices and for receiving and transmitted electronically constructed and transmitted messages;
   a server device connected to said communication network, said server capable of detecting and intercepting messages transmitted from said input/output terminal device;
   a software module for generating new distribution lists based on criteria contained in a message destination field of an electronically constructed and transmitted message, said software module containing logical operations and search routines used to generate new distribution lists; and
   a database containing currently generated distributions and individual entries, said individual entries being stored in records with fields containing identifiers that are used during searches of the database in the operation of generating a new distribution list;
   said server device configured to execute the software module to perform a method for generating a distribution list prior to the transmission of information wherein the generated list is based on the contents of information contained in a message destination field of a message containing information to be transmitted, said method comprising the steps of:
   detecting and intercepting a message transmission attempt;
   identifying, from the contents of the information contained in the message destination field of the message, one or more sources of entrants for a distribution list;
   identifying one or more operations needed for generating a new distribution list from the contents of the information in the message destination field;
   generating a new distribution list based on the application of identified operations to the one or more identified sources of entrants according to a specified order of the identified operations;
   determining storage requirements for the newly generated distribution list, the storage requirements being based on contents of the information in the message destination field; and
   transmitting the intercepted message to entries in the newly generated distribution list.

13. The system of claim 12, wherein said determining storage requirements comprises:
   determining that the newly generated list is to be stored for a period of time beyond a time to distribute the transmitted information to each entry in the newly generated list;
   identifying an existing distribution list that is to be replaced by the newly generated distribution list for the period of time; and
   temporarily replacing the existing distribution list with the newly generated distribution list in response to a specification by a user of the contents of the information in the message destination field.

14. The system of claim 13, wherein said determining storage requirements further comprises the steps of:
   identifying temporal restrictions associated with the initial distribution lists and/or individual entrants that will be included or excluded temporarily within a specified start and end date pertaining to the period of time;
   tagging the temporal restrictions as non-permanent; and
   recording the period of the time in relation to the temporal restrictions.

15. The system of claim 14, said method further comprising the step of monitoring a time duration of the newly generated distribution list and terminating the newly generated distribution list when the time duration of the newly generated distribution list has expired.

16. The system of claim 12, wherein the contents of the message destination field comprise: (I) contents for identifying the one or more sources of entrants for the newly generated distribution list; and (ii) an identification of operations for generating the new distribution list and information for determining whether to save the newly generated distribution list.

17. The system of claim 12, wherein said generating the new distribution list comprises performing mathematical, logical, and/or programmable operations, said logical operations including UNION and XOR set operations.

18. A computer program product, comprising a tangible computer-readable storage device having a computer readable software stored therein, said computer readable software containing instructions configured to be executed by a server device to implement a method for generating a distribution list prior to the transmission of information wherein the generated list is based on the contents of information contained in a message destination field of a message containing information to be transmitted, said method comprising the steps of:
   detecting and intercepting a message transmission attempt;
   identifying, from the contents of the information contained in the message destination field of the message, one or more sources of entrants for a distribution list;
   identifying one or more operations needed for generating a new distribution list from the contents of the information in the message destination field;
   generating the new distribution list based on the application of identified operations to the one or more identified sources of entrants according to the specified order of the identified operations;
   determining storage requirements for the newly generated distribution list, the storage requirements being based on contents of the information in the message destination field; and
   transmitting the intercepted message to entries in the newly generated distribution list,
   wherein said determining storage requirements comprises:
   determining that the newly generated list is to be stored for a period of time beyond a time to distribute the transmitted information to each entry in the newly generated list;
   identifying an existing distribution list that is to be replaced by the newly generated distribution list for the period of time; and
   temporarily replacing the existing distribution list with the newly generated distribution list in response to a specification by a user of the contents of the information in the message destination field, wherein said determining storage requirements further comprises the steps of:

identifying temporal restrictions associated with the initial distribution lists and/or individual entrants that will be included or excluded temporarily within a specified start and end date pertaining to the period of time;

tagging the temporal restrictions as non-permanent; and recording the period of the time in relation to the temporal restrictions.

19. The computer program product of claim 18, said method further comprising the step of monitoring a time duration of the newly generated distribution list and terminating the newly generated distribution list when the time duration of the newly generated distribution list has expired.

* * * * *